United States Patent
Perttunen et al.

(10) Patent No.: US 6,891,467 B2
(45) Date of Patent: May 10, 2005

(54) MULTISTAGE VEHICLE SECURITY SYSTEM

(75) Inventors: Karl V. Perttunen, Sylvan Lake, MI (US); Mark R. Caron, Warren, MI (US); David M. Chi, Birmingham, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 27 days.

(21) Appl. No.: 10/426,202

(22) Filed: Apr. 29, 2003

(65) Prior Publication Data

US 2004/0217850 A1 Nov. 4, 2004

(51) Int. Cl.[7] .............................................. B60R 25/10
(52) U.S. Cl. ............................. 340/426.17; 340/5.82; 340/5.72; 340/10.51; 340/825.69; 340/425.5; 340/5.52; 307/10.2; 180/287
(58) Field of Search ........................ 340/426.17, 5.52, 340/5.53, 5.23, 5.72, 5.6, 5.82, 5.83, 5.84, 425.5, 5.2, 5.31, 5.61, 10.1, 10.51, 825.64; 307/10.1, 10.2; 180/287

(56) References Cited

U.S. PATENT DOCUMENTS

| | | | |
|---|---|---|---|
| 4,754,255 A | | 6/1988 | Sanders et al. |
| 5,481,253 A | | 1/1996 | Phelan et al. |
| 5,682,135 A | * | 10/1997 | Labonde ............... 340/426.17 |
| 5,684,454 A | * | 11/1997 | Nishioka et al. ....... 340/426.12 |
| 5,783,994 A | * | 7/1998 | Koopman et al. ..... 340/426.36 |
| 5,801,616 A | | 9/1998 | Ghazarian et al. |
| 5,938,706 A | | 8/1999 | Feldman |
| 6,100,811 A | | 8/2000 | Hsu et al. |
| 6,140,939 A | | 10/2000 | Flick |
| 6,271,745 B1 | | 8/2001 | Anzai et al. |
| 6,686,670 B1 | | 2/2004 | Weigl et al. |
| 6,714,119 B1 | * | 3/2004 | Mindl et al. ............... 340/5.72 |

FOREIGN PATENT DOCUMENTS

| GB | 2349257 | 10/2002 |
|---|---|---|
| WO | WO 00/23303 | 4/2000 |

* cited by examiner

*Primary Examiner*—Anh V. La
(74) *Attorney, Agent, or Firm*—Brinks Hofer Gilson & Lione

(57) ABSTRACT

A multistage vehicle security system includes a transceiver that receives a first signal sent from a transponder and a controller that processes the first signal. The controller activates low level operational features of the vehicle if the signal is associated with an authorized transponder. The system also includes an entry sensor that detects the physical presence of a user. The transponder sends a second signal to the transceiver when the presence of the user is detected. The controller processes the second signal and activates midlevel operational features of the vehicle if the second signal is associated with the authorized transponder. Once the user is inside the vehicle, a sensor detects a biometric characteristic of the user. The user obtains access to one or more high level operational features of the vehicle if the detected biometric characteristic matches that of an authorized user.

17 Claims, 4 Drawing Sheets

MULTISTAGE VEHICLE SECURITY SYSTEM

BACKGROUND

1. Technical Field

The present invention relates generally to vehicle security systems, and more particularly relates to multistage vehicle security systems.

2. Background Information

In the past, vehicles have been protected by locks and alarm systems activated by the car owner, for example, with a transmitter attached to a fob. However, conventional alarm systems do not have a way of distinguishing the owner of the fob from any unauthorized users of the vehicle. Thus, if a thief gets possession of the fob, the thief has immediate access to the vehicle as if the thief was the owner of the vehicle.

Certain systems use biometric sensors to identify the individual who is attempting to gain entry into the vehicle and/or access to the operation of the vehicle. For example, the biometric sensor may detect the voice of the user or the user's fingerprints. If the security system determines that the detected biometric characteristic is associated with an authorized user, then the system allows the user access to the operation of the vehicle.

BRIEF SUMMARY

The present invention provides a multistage vehicle security system that overcomes the limitations and drawbacks of the prior art. The system includes a transceiver that receives a first signal sent from a transponder, such as a remote keyless entry ("RKE") fob, and a controller that processes the first signal. The controller activates low level operational features of the vehicle, for example, individual comfort settings, if the signal is associated with an authorized transponder. The system also includes an entry sensor that detects the physical presence of a user. The transponder sends a second signal to the transceiver when the presence of the user is detected. The controller processes the second signal and activates midlevel operational features of the vehicle, for example, access to the interior of the vehicle, if the second signal is associated with the authorized transponder. Once the user is inside the vehicle, a sensor detects a biometric characteristic of the user. The user obtains access to one or more high level operational features of the vehicle, such as the ignition and/or transmission, if the detected biometric characteristic matches that of an authorized user.

Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

The accompanying drawings, incorporated in and forming a part of the specification, illustrate several aspects of the present invention and, together with the description, serve to explain the principles of the invention. The components in the figures are not necessarily to scale, emphasis instead being placed upon illustrating the principles of the invention. Moreover, in the figures, like reference numerals designate corresponding parts throughout the views. In the drawings.

DETAILED DESCRIPTION

Figure 1:
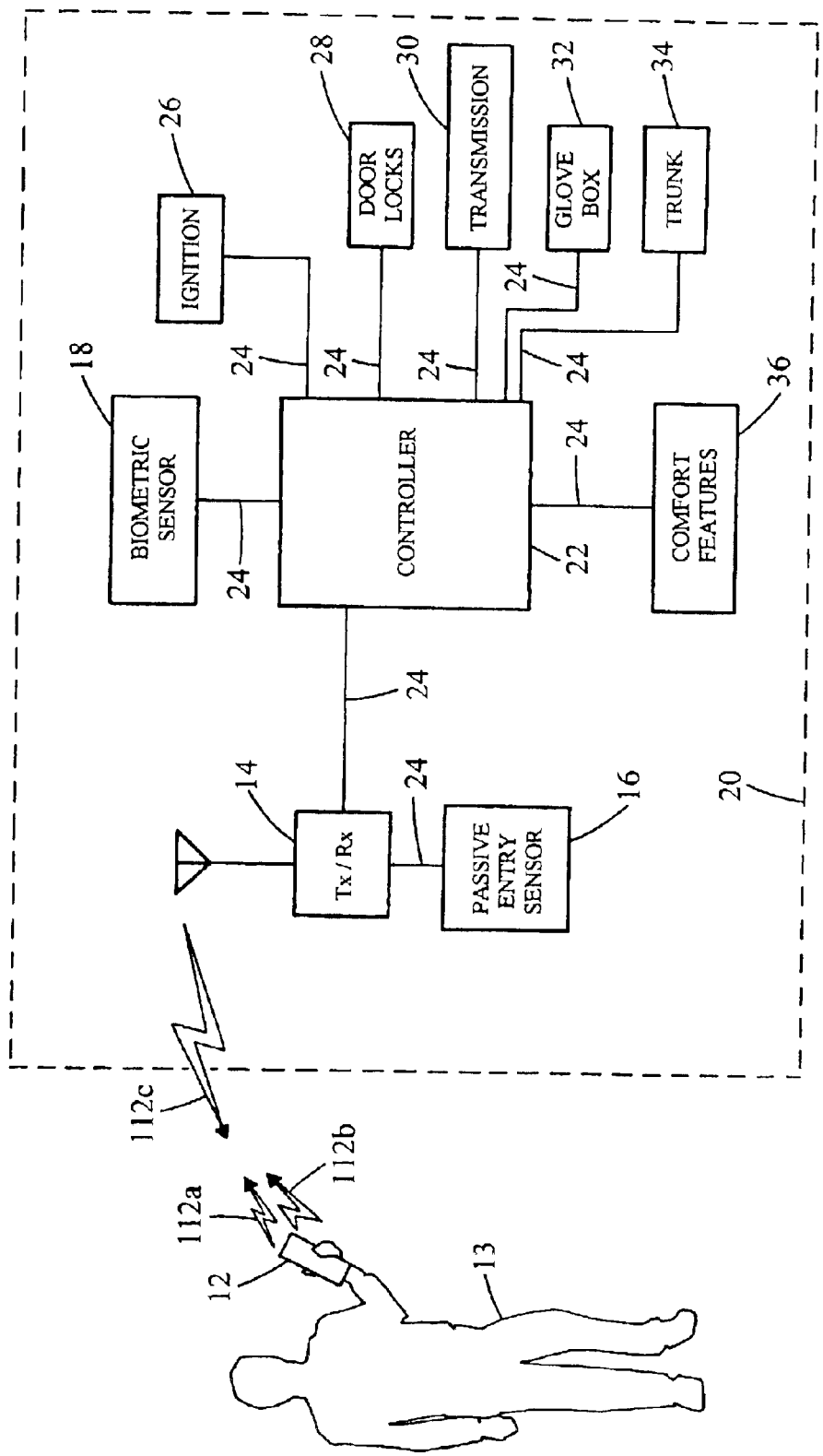
FIG. 1 is a schematic diagram of a multi-stage vehicle security system in accordance with the invention.

FIG. 1 illustrates a multistage vehicle security system, generally identified as 10, for a vehicle 20. The system 10 includes a transponder, such as a remote keyless entry ("RKE") fob 12 held by a user 13, a transceiver 14, a passive entry sensor 16, and a biometric sensor 18. The transceiver 14, the passive entry sensor 16, and the biometric sensor 18 typically reside in the vehicle 20, and a controller 22, also residing in the vehicle 20, communicates with the transceiver 14, the passive entry sensor 16, and the biometric sensor 18 through a vehicle network 24. Through the network 24, the controller 22 controls the access to various aspects of the vehicle 20, such as the vehicle's ignition 26, locks 28, transmission 30, glove box 32, and trunk 34. The controller 22 may also direct the operation of other comfort features 36 of the vehicle 20, such as the seat settings, the climate control, and the entertainment system.

As shown in FIG. 1, the system 10 is a three stage security system. The lowest level security (stage one) involves the user 13 pressing a button on the RKE fob 12 as the user approaches the car to activate certain comfort features of the vehicle 20, such as the seat settings, the entertainment system, or the heating or air conditioning system. Optionally, stage 1 may allow the user 13 to start the vehicle 20 from outside the vehicle.

The next level of security (stage two) is provided by the passive entry sensor 16 that allows the user 13 access to the vehicle 20 after detecting the presence of the user 13. That is, stage two unlocks the doors if the user is authorized to enter the vehicle. The passive entry sensor 16 may be a touchpad on the door or a movement sensor in the door handle that senses when the handle is pulled. Alternatively, stage two may employ a poling strategy to determine when the user is within close proximity of the vehicle.

Once the user 13 gains access to the vehicle 20, the biometric sensor 18 provides the highest level security (stage three). The biometric sensor 18 can be one or more of a number of different types of sensors. For example, the biometric sensor 18 may be a voice recognition sensor, a fingerprint identification sensor, or a sensor for iris identification, retina scanning, handprint, lightprint, or face recognition. After successfully passing stage three, the user has access to high level operational features of the vehicle. These high level operational features may include, for example, operation of the ignition, transmission, trunk, glove box or full access to the vehicle 20. Note that these high level operational features are accessible only after the RKE transponder 12 and the passive entry sensor 16 are used in conjunction with the biometric sensor 18. That is, all three stages must be sequentially passed from stage one to stage one for the user to gain full operational access to the vehicle 20.

The performance of the biometric sensor 18 can be characterized by its false rejection rate ("FRR") and false acceptance rate ("FAR"). The FRR indicates the probability of rejecting an enrolled profile, that is, an authorized user, while the FAR indicates the probability of accepting a non-enrolled profile, that is, an unauthorized user. Thus, as the FAR decreases, the sensor becomes more secure. However, in a more secure system, the FRR increases, thus making the sensor potentially less friendly for the user. When the biometric sensor is used in a multistage security system as discussed in connection with the present invention, a biometric sensor with a higher FAR can be tolerated because the other stages of the security system compensate for a less secure sensor, thus making the system more user friendly since there is a corresponding decrease in the sensor's FRR.

In some implementations, stage three of the system 10, namely, the use of the biometric sensor 18, will have a false rejection rate of no worse than 10E-3, which will result in a higher false acceptance rate of, for example, 10E-2. However, combining the biometric sensor 18 with the use of the RKE transponder 12 and the passive entry sensor 16 improves the overall security of the vehicle 13, as compared to the use of the biometric sensor 18 alone.

Moreover, the controller 22 will assign a confidence level for each measurement performed by the biometric sensor 18. High confidence matching allows immediate authorization, while low confidence matching result in additional security checks. For example, the user might have to additionally provide a password or passphrase, or a PIN number upon a low confidence match by the biometric sensor 18.

Figure 2A:
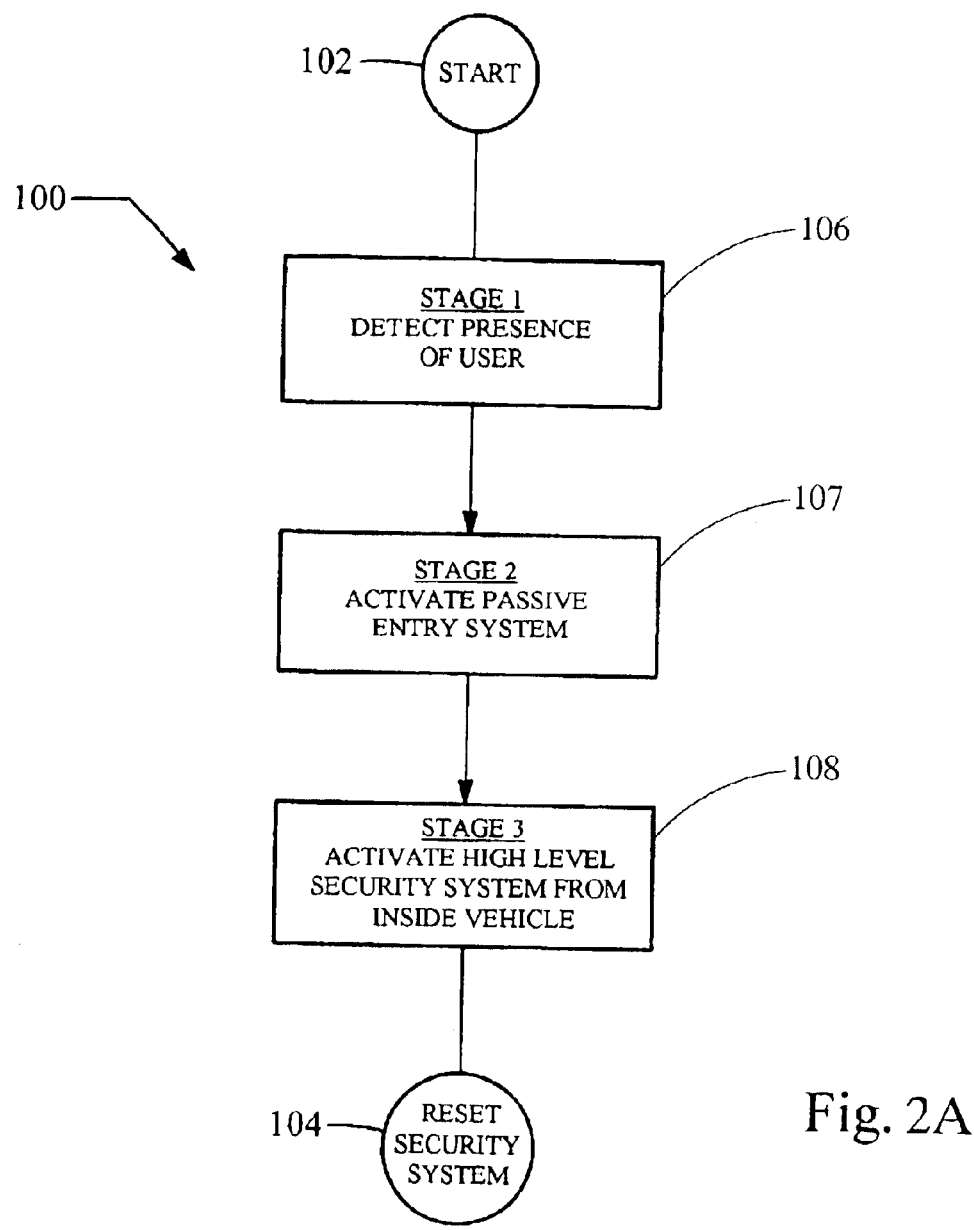
FIG. 2A is a flow diagram of the overall operation of the multi-stage vehicle security system of FIG. 1 in accordance with the invention.

Referring now to FIG. 2A, the overall multistage sequential operation 100 of the system 10 is shown. In brief, stage one, in step 106, senses the long-range presence of the user 13. Stage two, in step 107, involves detection of the physical contact between the user 13 and the vehicle 20 through the use of the passive entry sensor 16 to ensure that the user is within close proximity to the vehicle 20 before the system 10 allows the user access to the interior of the vehicle 20. Alternatively, stage two involves detecting the short-range presence of the user, for example, when the user 13 is within two to three feet of the vehicle 20, such that physical contact between the user 13 and the vehicle 20 is not required to pass stage two. If the user 13 is able to get inside the vehicle 20, then stage three, in step 108, involves the interaction between the user 13 and the biometric sensor 18 to allow the user to operate certain other high level operational features of the vehicle 20.

Figure 2B:
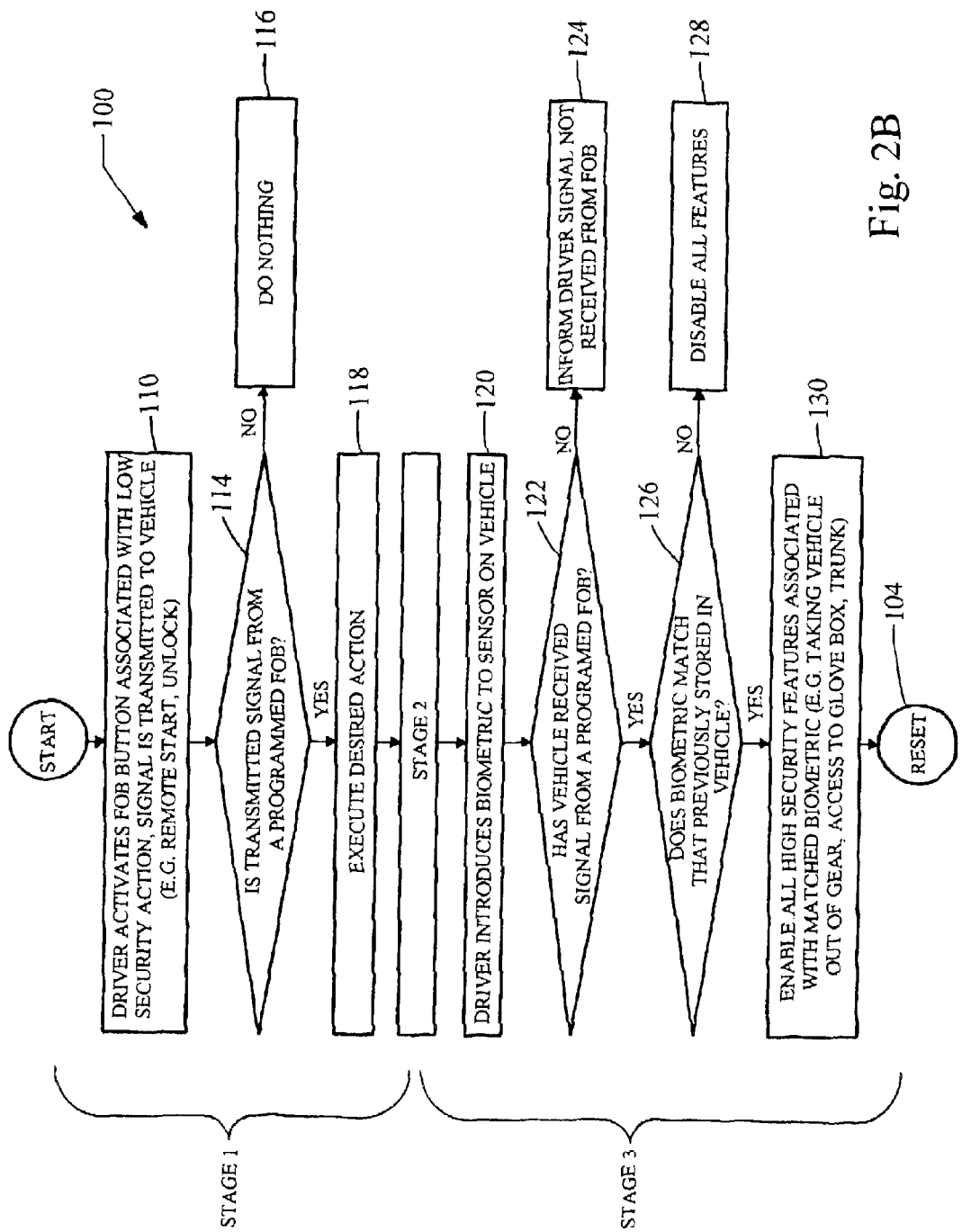
FIG. 2B is a detail flow diagram of a two stage operation of the multi-stage security system of FIG. 1 in accordance with the invention.

Although described above as a three stage operation, the process 100 can operate as a two stage security system (for example, stages one and three) as illustrated in greater detail in FIG. 2B. As a two stage security system, in step 110, the user 13 activates the RKE fob 12. The RKE fob 12 sends a long-range wireless communication signal, such as a radio frequency ("RF") signal 112a, to the transceiver 14, which communicates this information to the controller 22.

In step 114, the controller 22 determines if the signal 112a is associated with a programmed RKE fob, that is, if the RKE fob is allowed to activate certain features of the vehicle. If the RKE fob 12 is not an authorized fob, the controller 22 does not allow the user 13 access to the vehicle nor to operate the vehicle 20, as indicated in step 116. If the signal 112a is from a programmed RKE fob, then the process 100 executes the desired function in step 118. For example, the desired function may be the operation of certain comfort features, such as the seat settings, the climate control, or the entertainment system. Alternatively, in a two stage security system, the desired function may be the ignition of the vehicle and/or the operation of the door locks.

Once inside the vehicle 20, the user 13 interacts with the biometric sensor 18. The process 100 once again in step 122 checks if the signal 112a is from a programmed RKE fob to ensure that the user 13 did not somehow gain access to the vehicle 20 without first using the proper RKE fob 12. If the signal 112a is not from a programmed RKE fob, then in step 124 the system 10 communicates this information to the user 13, for example, by audio or visual transmissions.

If, in step 126, the process 100 checks for a match between the biometric characteristic detected by the sensor 18 and that of an authorized user stored, for example, in the memory of the controller 22. If there is no match between the detected biometric characteristic and the stored value, then the controller 22 disables all features of the vehicle 20. If the controller 22 determines that there is a match, the process 100 enables all high level operational features of the vehicle 20. For example, the user 13 may be allowed to shift the transmission 30 into another gear, access the vehicle's ignition 26, access the glove box 32, or access the trunk 34.

Figure 2C:
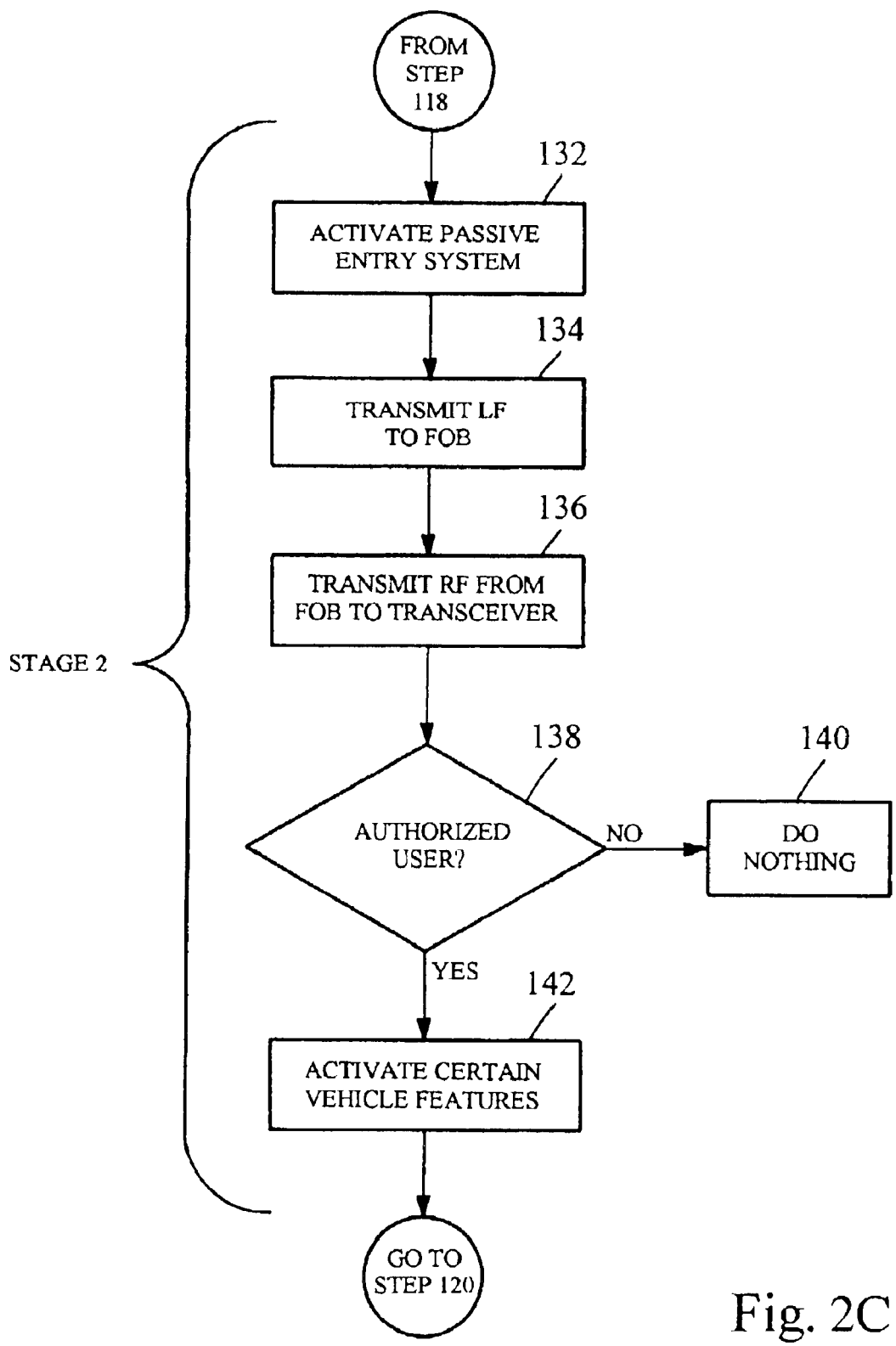
FIG. 2C, in conjunction with FIG. 2B, is a detail flow diagram of a three stage operation of the multi-stage security system of FIG. 1 in accordance with the invention.

When the system 10 operates as a three stage security system, the user must also pass the vehicle's passive entry system, the operation of which is illustrated in FIG. 2C. As shown, the activation of the passive entry system typical occurs after step 118 of stage one (FIG. 2B).

Accordingly, in step 132, the user 13 activates the passive entry system, for example, by touching a touch pad on the vehicle or by pulling on the door handle. The passive entry sensor 16 detects such contact and communicates this information to the transceiver 14. In step 134, the transceiver 14 then transmits a short-range wireless signal, such as a low frequency ("LF") signal 112c (FIG. 1), to the RKE fob 12. Because the signal 112c from the transceiver 14 is a low frequency signal, the user 13 must be in close proximity to the vehicle for the RKE fob 12 to receive the LF signal. Thus, stage 2 cannot be passed unless the user is standing next to the vehicle, for example, within two to three feet of the vehicle.

Alternatively, the entry sensor 16 employs a poling strategy in which a periodic LF transmission (or short-range wireless signal) is transmitted that does not require physical contact between the user 13 and the vehicle 20 to initiate the LF signal from the passive entry sensor 16.

Once the RKE fob 12 is within range of the LF transmission in the scenarios discussed above, the RKE fob 13, in step 136, transmits a second long-range wireless or RF signal 112b to the transceiver 14, which communicates this information to the controller 22. In step 138, the controller 22 processes the signal 112b and determines if the signal 112b is associated with an authorized fob.

If the RKE fob 13 is not an authorized fob, the system 10 does nothing as indicated in step 140, that is, the doors remain locked to prevent the user 13 from entering the vehicle 20. If the signal 112b is associated with an authorized fob, then in step 142 the controller 22 unlocks one or more of the vehicle's doors to allow the user to enter into the vehicle 20, and the process proceeds to step 120 of stage three.

In other implementations of a two stage security system, stage one can be use in conjunction with stage two, or stage two can be used in conjunction with stage three.

It is therefore intended that the foregoing detailed description be regarded as illustrative rather than limiting, and that it be understood that it is the following claims, including all equivalents, that are intended to define the spirit and scope of this invention.

What is claimed is:

1. A multistage security system for a vehicle, comprising:
   a transceiver which receives a first signal sent from a transponder;
   a controller which processes the first signal and activates low level operational features of the vehicle 1f the controller determines that the first signal is associated with an authorized transponder;
   an entry sensor which detects the physical presence of a user, the transponder transmitting a second signal to the transceiver when the presence of the user is detected, the controller processing the second signal and activating midlevel operational features of the vehicle if the second signal is associated with the authorized transponder; and
   a sensor which detects a biometric characteristic of the user, the user obtaining access to one or more high level operational features of the vehicle if the detected biometric characteristic matches the biometric characteristic of an authorized user.

2. The system of claim 1, wherein the signal from the transponder is associated with long-range wireless communication.

3. The system of claim 1, wherein the biometric characteristic is a voice of the user.

4. The system of claim 1, wherein the biometric characteristic is the fingerprint of the user.

5. The system of claim 1, wherein the transceiver transmits a signal associated with short-range wireless communication to the transponder to detect the physical presence of the user.

6. The system of claim 5, wherein the controller unlocks one or more of the vehicle's doors if the transponder is an authorized transponder.

7. The system of claim 1, wherein the low level operational features is selected from the group including climate control, seat settings, entertainment system, glove box, trunk, and ignition.

8. The system of claim 1, wherein the mid level operational features includes access to the vehicle.

9. The system of claim 1, wherein the high level operational features includes vehicle ignition and vehicle transmission and e-commerce vehicle features.

10. The system of claim 1, wherein the biometric characteristic is selected from the group consisting of iris identification, retina scanning, handprint, lightprint, and face recognition.

11. A method of authorizing user access to a vehicle, comprising:
    activating a transponder to send a first signal to a transceiver residing in the vehicle;
    activating low level operational features of the vehicle if the first signal is associated with an authorized transponder;
    detecting the physical presence of the user;
    transmitting a second signal from the transponder to the transceiver if the presence of the user is detected;
    allowing access to the interior of the vehicle if the second signal is associated with the authorized transponder;
    after the user enters the vehicle, sensing one or more biometric characteristics of the user;
    comparing the sensed biometric characteristic with a stored biometric characteristic; and
    enabling access to one or more high level operational features of the vehicle if the biometric characteristic matches with the stored biometric characteristic.

12. The method of claim 11, wherein the signal from the transponder is associated with long-range wireless communication.

13. The method of claim 11, wherein the biometric characteristic is a voice of the user.

14. The method of claim 11, wherein the biometric characteristic is a fingerprint of the user.

15. The method of claim 11, wherein the transceiver transmits a signal associated with short-range wireless communication to the transponder to detect the physical presence of the user.

16. The method of claim 15, wherein the controller unlocks one or more of the vehicle's doors if the transponder is an authorized transponder.

17. The method of claim 11, wherein the biometric characteristic is selected from the group consisting of iris identification, retina scanning, handprint, lightprint, and face recognition.

* * * * *

UNITED STATES PATENT AND TRADEMARK OFFICE
CERTIFICATE OF CORRECTION

PATENT NO.    : 6,891,467 B2
DATED         : May 10, 2005
INVENTOR(S)   : Karl V. Perttunen et al.

It is certified that error appears in the above-identified patent and that said Letters Patent is hereby corrected as shown below:

Column 5,
Line 5, after "of the vehicle" delete "1f" and substitute -- if -- in its place.

Signed and Sealed this

First Day of November, 2005

JON W. DUDAS
*Director of the United States Patent and Trademark Office*